(12) United States Patent
Tranninger et al.

(10) Patent No.: US 9,388,304 B2
(45) Date of Patent: Jul. 12, 2016

(54) TIGER STRIPE MODIFIER

(71) Applicant: Borealis AG, Vienna (AT)

(72) Inventors: Michael Tranninger, Pucking (AT); Georg Grestenberger, St. Peter in der Au (AT); Martina Sandholzer, Linz (AT); Simon Schwarzengerger, Linz (AT); Susanne Kahlen, Leonding (AT); Gregory Potter, Linz (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 14/443,797

(22) PCT Filed: Nov. 28, 2013

(86) PCT No.: PCT/EP2013/075014
§ 371 (c)(1),
(2) Date: May 19, 2015

(87) PCT Pub. No.: WO2014/083129
PCT Pub. Date: Jun. 5, 2014

(65) Prior Publication Data
US 2015/0299443 A1    Oct. 22, 2015

(30) Foreign Application Priority Data
Nov. 29, 2012   (EP) .................................... 12194766

(51) Int. Cl.
*C08L 23/12* (2006.01)
*C08L 23/16* (2006.01)

(52) U.S. Cl.
CPC .................. *C08L 23/12* (2013.01); *C08L 23/16* (2013.01); *C08L 2205/02* (2013.01); *C08L 2207/02* (2013.01)

(58) Field of Classification Search
CPC ......... C08L 23/12; C08L 23/16; C08L 23/14; C08L 2500/02; C08L 2500/17; C08L 2500/21; C08L 2500/12; C08F 210/06; C08F 2/001; C08F 110/06; C08F 4/6545; C08F 4/6492
See application file for complete search history.

(56) References Cited

FOREIGN PATENT DOCUMENTS

| EP | 2275485 A1 | 1/2011 |
|---|---|---|
| WO | 0228958 A2 | 4/2002 |
| WO | 2010108866 A1 | 9/2010 |

OTHER PUBLICATIONS

European Search Report complete Feb. 25, 2013.

*Primary Examiner* — Nathan M Nutter
(74) *Attorney, Agent, or Firm* — Tarolli, Sundheim, Covell & Tummino LLP

(57) ABSTRACT

Tiger stripe modifier being a heterophasic polypropylene composition having a melt flow rate $MFR_2$ (230° C.) in the range of 0.5 to 20 g/10 min and comprises a propylene homopolymer and an elastomeric propylene copolymer, wherein said propylene homopolymer has a melt flow rate $MFR_2$ (230° C.) in the range of above 10 to 300 g/10 min; the xylene cold soluble fraction of the heterophasic polypropylene composition has an intrinsic viscosity in the range of more than 2.5 to below 11.0 dl/g; and the comonomer content of the xylene cold soluble fraction of the heterophasic polypropylene composition is in the range of 10.0 to 25.0 wt.-%; wherein further the heterophasic polypropylene composition fulfills the inequation (I) $0.3 \geq (0.241 \times C) - (1.14 \times IV)$ (I) wherein C is the comonomer content of the xylene cold soluble (XCS) fraction of the heterophasic polypropylene composition (HECO1), and IV is the intrinsic viscosity of the xylene cold soluble (XCS) fraction of the heterophasic polypropylene composition (HECO1).

8 Claims, No Drawings

TIGER STRIPE MODIFIER

The present invention is directed to a new heterophasic propylene copolymer which reduces significantly the flow marks of injection molded articles containing said new copolymer. Further the invention is directed to compositions as well as injection molded articles comprising said new heterophasic propylene copolymer. Finally the invention is directed to the use of the heterophasic propylene copolymer to reduce the flow marks in injection molded articles.

Polypropylene is the material of choice in many applications as it can be tailored to specific purposes needed. For instance heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a propylene copolymer rubber, like an ethylene propylene rubber (EPR) or an ethylene propylene diene monomer polymer (EPDM). In the automobile industry such heterophasic polypropylene grades contain quite often an amount of about 30 wt.-% propylene copolymer rubber, which normally is produced directly in one or two gas phase reactors or added externally to the matrix via a compounding step. However such heterophasic material quite often show low appearance if injection molded, i.e. show undesired flow marks. The appearance of flow marks on the surface of injection molded parts is known for years. While this surface defect is not an issue for low end applications or applications with an additional surface finishing step like painting it is not desired in applications like automotive dashboards or unpainted bumpers.

Accordingly it is desired to find a solution to produce injection molded articles without flow marks. Therefore the object of the present invention is to provide a polymer which reduces flow marks in injection molded systems.

The finding of the present invention is to provide a heterophasic system with balanced comonomer/intrinsic viscosity ratio in the xylene cold soluble (XCS) fraction of the same.

Accordingly the present invention is directed to an heterophasic polypropylene composition (HECO1) having a melt flow rate MFR$_2$ (230° C.) measured according to ISO 1133 in the range of 0.5 to 20 g/10 min, said heterophasic polypropylene composition (HECO1) comprises a propylene homopolymer (H-PP) and an elastomeric propylene copolymer (E), wherein (a) said propylene homopolymer (H-PP) has a melt flow rate MFR$_2$ (230° C.) measured according to ISO 1133 in the range of above 10 to 300 g/10 min, preferably in the range of 10 to 90 g/10 min, more preferably in the range of 10 to 70 g/10 min;

(b) the xylene cold soluble (XCS) fraction of the heterophasic polypropylene composition (HECO1) has an intrinsic viscosity determined according to DIN ISO 1628/1 (in decalin at 135° C.) in the range of more than 2.5 to below 11.0 dl/g; and (c) the comonomer content of the xylene cold soluble (XCS) fraction of the heterophasic polypropylene composition (HECO) is in the range of 10.0 to 25.0 wt.-%;

wherein further (d) the heterophasic polypropylene composition (HECO1) fulfills the inequation (I)

$$0.30 \geq \left(0.241 \times \frac{c}{\text{wt.-\%}}\right) - \left(1.14 \times \frac{IV}{\text{dl/g}}\right) \quad (I)$$

wherein

C is the comonomer content in wt.-% of the xylene cold soluble (XCS) fraction of the heterophasic polypropylene composition (HECO1), and IV is the intrinsic viscosity in dl/g of the xylene cold soluble (XCS) fraction of the heterophasic polypropylene composition (HECO1).

Alternatively the present invention is directed to an heterophasic polypropylene composition (HECO1) having a melt flow rate MFR$_2$ (230° C.) measured according to ISO 1133 in the range of 0.5 to 20 g/10 min, said heterophasic polypropylene composition (HECO1) comprises a propylene homopolymer (H-PP) and an elastomeric propylene copolymer (E), wherein (a) the xylene cold insoluble (XCI) of the heterophasic polypropylene composition (HECO1) has a melt flow rate MFR$_2$ (230° C.) in the range of above 10 to 300 g/10 min, preferably in the range of 10 to 90 g/10 min, more preferably in the range of 10 to 70 g/10 min;

(b) the xylene cold soluble (XCS) fraction of the heterophasic polypropylene composition (HECO1) has an intrinsic viscosity determined according to DIN ISO 1628/1 (in decalin at 135° C.) in the range of more than 2.5 to below 11.0 dl/g; and (c) the comonomer content of the xylene cold soluble (XCS) fraction of the heterophasic polypropylene composition (HECO) is in the range of 10.0 to 25.0 wt.-%;

wherein further (d) the heterophasic polypropylene composition (HECO1) fulfills the inequation (I)

$$0.30 \geq \left(0.241 \times \frac{c}{\text{wt.-\%}}\right) - \left(1.14 \times \frac{IV}{\text{dl/g}}\right) \quad (I)$$

wherein

C is the comonomer content in wt.-% of the xylene cold soluble (XCS) fraction of the heterophasic polypropylene composition (HECO1), and IV is the intrinsic viscosity in dl/g of the xylene cold soluble (XCS) fraction of the heterophasic polypropylene composition (HECO1).

Preferably the heterophasic polypropylene composition (HECO1) as defined above in the two embodiments has a melt flow rate MFR$_2$ (230° C.) in the range of above 0.5 to 10.0 g/10 min.

With such a heterophasic polypropylene composition (HECO1) compositions can be provided with which injection molded articles are producible having nearby no flow marks. Thus the present invention is also directed to a composition comprising a polyolefin (PO), the instant heterophasic polypropylene composition (HECO1), and optionally a inorganic filler (F), wherein the weight ratio between the polyolefin (PO) and the heterophasic polypropylene composition (HECO1) [PO/HECO1] is in the range of 2/1 to 8/1 and wherein further the polyolefin (PO) is not the heterophasic polypropylene composition (HECO1) as defined in the instant invention.

Further the present invention is directed to an injection molded article comprising the instant heterophasic polypropylene composition (HECO1), more preferably comprising a composition as defined in the previous paragraph. The injection molded article is preferably an automotive article.

Finally the present invention is directed to the use of the instant heterophasic polypropylene composition (HECO1) in a composition comprising in addition to said heterophasic polypropylene composition (HECO1) a polyolefin (PO) and optionally a inorganic filler (F) to reduce flow marks of injection molded article made from said composition, with the proviso that the polyolefin (PO) is not the instant heterophasic polypropylene composition (HECO1).

In the following the present invention is described in more detail.

The heterophasic propylene copolymer (HECO1)

Essential component of the present invention is the heterophasic propylene copolymer (HECO1).

The heterophasic propylene copolymer (HECO1) has a melt flow rate MFR$_2$ (230° C.) measured according to ISO 1133 in the range of 0.5 to 20 g/10 min and comprises a propylene homopolymer (H-PP) and an elastomeric propylene copolymer (E), wherein (a) said propylene homopolymer (H-PP) has a melt flow rate MFR$_2$ (230° C.) measured according to ISO 1133 in the range of above 10 to 300 g/10 min, preferably in the range of 10 to 90 g/10 min, more preferably in the range of 10 to 70 g/10 min;

(b) the xylene cold soluble (XCS) fraction of the heterophasic polypropylene composition (HECO1) has an intrinsic viscosity determined according to DIN ISO 1628/1 (in decalin at 135° C.) in the range of more than 2.5 to below 11.0 dl/g; and (c) the comonomer content of the xylene cold soluble (XCS) fraction of the heterophasic polypropylene composition (HECO) is in the range of 10.0 to 25.0 wt.-%;

wherein further (d) the heterophasic polypropylene composition (HECO1) fulfills the inequation (I)

$$0.30 \geq \left(0.241 \times \frac{c}{\text{wt.-\%}}\right) - \left(1.14 \times \frac{IV}{\text{dl/g}}\right) \quad (I)$$

wherein

C is the comonomer content in wt.-% of the xylene cold soluble (XCS) fraction of the heterophasic polypropylene composition (HECO1), and IV is the intrinsic viscosity in dl/g of the xylene cold soluble (XCS) fraction of the heterophasic polypropylene composition (HECO1).

Alternatively the present invention is directed to an heterophasic polypropylene composition (HECO1) having a melt flow rate MFR$_2$ (230° C.) measured according to ISO 1133 in the range of 0.5 to 20 g/10 min, said heterophasic polypropylene composition (HECO1) comprises a propylene homopolymer (H-PP) and an elastomeric propylene copolymer (E), wherein (a) the xylene cold insoluble (XCI) of the heterophasic polypropylene composition (HECO1) has a melt flow rate MFR$_2$ (230° C.) measured according to ISO 1133 in the range of above 10 to 300 g/10 min, preferably in the range of 10 to 90 g/10 min, more preferably in the range of 10 to 70 g/10 min;

(b) the xylene cold soluble (XCS) fraction of the heterophasic polypropylene composition (HECO1) has an intrinsic viscosity determined according to DIN ISO 1628/1 (in decalin at 135° C.) in the range of more than 2.5 to below 11.0 dl/g; and (c) the comonomer content of the xylene cold soluble (XCS) fraction of the heterophasic polypropylene composition (HECO) is in the range of 10.0 to 25.0 wt.-%;

wherein further (d) the heterophasic polypropylene composition (HECO1) fulfills the inequation (I)

$$0.30 \geq \left(0.241 \times \frac{c}{\text{wt.-\%}}\right) - \left(1.14 \times \frac{IV}{\text{dl/g}}\right) \quad (I)$$

wherein

C is the comonomer content in wt.-% of the xylene cold soluble (XCS) fraction of the heterophasic polypropylene composition (HECO1), and IV is the intrinsic viscosity in dl/g of the xylene cold soluble (XCS) fraction of the heterophasic polypropylene composition (HECO1).

In the following both embodiments are described together.

The term heterophasic propylene copolymer is understood as known in the technical field. Accordingly the heterophasic propylene comprises a polymer matrix, like a (semi)crystalline polypropylene, in which the amorphous material, like an elastomeric propylene copolymer, is dispersed.

Thus the heterophasic polypropylene composition (HECO1) comprises a matrix (M) being a propylene homopolymer (H-PP) and dispersed therein the elastomeric propylene copolymer (E). Thus the matrix (M) contains (finely) dispersed inclusions being not part of the matrix (M) and said inclusions contain the elastomeric propylene copolymer (E). The term "inclusion" according to this invention shall preferably indicate that the matrix and the inclusion form different phases within the heterophasic propylene copolymer (HECO1), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

As mentioned above the heterophasic propylene copolymer (HECO1) comprises a propylene homopolymer (H-PP). Said propylene homopolymer (H-PP) constitutes the matrix (M) of the heterophasic propylene copolymer (HECO1).

As the propylene homopolymer (H-PP) is nearby xylene cold insoluble and the elastomeric propylene copolymer (E) is predominantly soluble in cold xylene, the properties of xylene cold insoluble (XCI) of the heterophasic polypropylene composition (HECO1) and of the propylene homopolymer (H-PP) are quite similar Accordingly, the xylene cold insoluble (XCI) of the heterophasic polypropylene composition (HECO1) and the propylene homopolymer (H-PP) have a melt flow rate MFR$_2$ (230° C.) measured according to ISO 1133 in the range of 10 to 300 g/10 min, preferably in the range of 10 to 90 g/10 min, more preferably in the range of 10 to 70 g/10 min, still more preferably in the range of 10 to 65 g/10 min, like in the range of 10 to 60 g/10 min.

The propylene homopolymer (H-PP) can be monomodal or multimodal, like bimodal, in its molecular weight fraction.

In case the propylene homopolymer (H-PP) is multimodal, like bimodal, in its molecular weight, it comprises at least two fractions, preferably consist of two fractions, the fractions are a first propylene homopolymer fraction (H-PP1) and a second propylene homopolymer fraction (H-PP2). Preferably the two fractions differ in the melt flow rate $MFR_2$ (230° C.). Accordingly it is appreciated that the first propylene homopolymer fraction (H-PP1) differs by a melt flow rate $MFR_2$ (230° C.) of at least 5 g/10 min, more preferably by at least 20 g/10 min, still more preferably in a range from 5 to 50 g/10 min, yet more preferably in a range from 10 to 40 g/10 min, from the second propylene homopolymer fraction (H-PP2). Preferably the melt flow rate $MFR_2$ (230° C.) of the first propylene homopolymer fraction (H-PP1) is higher than the melt flow rate $MFR_2$ (230° C.) of the second propylene homopolymer fraction (H-PP2).

The expression propylene homopolymer used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable.

The elastomeric propylene copolymer (E) of the heterophasic propylene copolymer (HECO1) mainly influences the properties and amount of the xylene cold soluble (XCS) fraction of the heterophasic propylene copolymer (HECO1). Accordingly in a first approximation the properties of the elastomeric propylene copolymer (E) can be equated with the properties of the xylene cold soluble (XCS) fraction of the heterophasic propylene copolymer (HECO1). However in preferred embodiments the amount of elastomeric propylene copolymer (E) is higher than the total xylene cold soluble (XCS) content of the heterophasic propylene copolymer (HECO1).

Accordingly the amount of elastomeric copolymer (E) of the heterophasic propylene copolymer (HECO1) preferably is below 40.0 wt.-%, more preferably below 38.0 wt.-%, still more preferably in the range of 15.0 to 40.0 wt.-%, yet more preferably in the range of 17.0 to below 38.0 wt.-%.

On the other hand, the amount of the xylene cold soluble (XCS) fraction of the heterophasic propylene copolymer (HECO1) preferably is below 35.0 wt.-%, more preferably below 32.0 wt.-%, still more preferably in the range of 11.0 to 35.0 wt.-%, yet more preferably in the range of 15.0 to 32.0 wt.-%.

The elastomeric propylene copolymer (E) comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises-apart from propylene-units derivable from ethylene and/or 1-butene. Thus in an especially preferred embodiment the elastomeric propylene copolymer phase (E) comprises units derivable from ethylene and propylene only, i.e. is a propylene-ethylene rubber (EPR).

The comonomer content, preferably the ethylene content, of the elastomeric propylene copolymer (E) based on the total weight of the elastomeric propylene copolymer (E) preferably is not more than 30.0 wt.-%, more preferably not more than 25.0 wt.-%, still more preferably in the range of 10.0 to 30.0 wt.-%, yet more preferably in the range of more than 12.0 to 25.0 wt.-%, still yet more preferably in the range of more than 12.0 to 20.0 wt.-%.

In turn it is preferred that the comonomer content, preferably the ethylene content, of the xylene cold soluble (XCS) fraction of the heterophasic propylene copolymer (HECO1) is not more than 25.0 wt.-%, still more preferably not more than 20.0 wt.-%, yet more preferably in the range of 10.0 to 25.0 wt.-%, still yet more preferably in the range of 12.0 to 20.2 wt.-%.

Additionally it is required that the molecular weight of the xylene cold soluble (XCS) fraction of the heterophasic propylene copolymer (HECO1) is in a specific range. Accordingly it is appreciated that the xylene cold soluble (XCS) fraction of the heterophasic propylene copolymer (HECO1) has an intrinsic viscosity (IV) determined according to DIN ISO 1628/1 (in decalin at 135° C.) in the range of more than 2.5 to below 11.0 dl/g, more preferably in the range of 3.0 to 11.0 dl/g, still more preferably in the range of 4.0 to 11.0 dl/g.

An essential aspect of the present invention is that the intrinsic viscosity (IV) and the comonomer content, preferably the ethylene content, of the xylene cold soluble fraction of the heterophasic propylene copolymer (HECO1) are aligned to each other. Accordingly it is required that the heterophasic propylene copolymer (HECO1) fulfills the inequation (I), preferably inequation (Ia), more preferably inequation (Ib), still more preferably inequation (Ic), yet more preferably inequation (Id), still yet more preferably inequation (Id), $$0.30 \geq \left(0.241 \times \frac{C}{\text{wt.-\%}}\right) - \left(1.14 \times \frac{IV}{\text{dl/g}}\right) \quad \text{(I)}$$

$$0.25 \geq \left(0.241 \times \frac{C}{\text{wt.-\%}}\right) - \left(1.14 \times \frac{IV}{\text{dl/g}}\right) \quad \text{(Ia)}$$

$$0.00 \geq \left(0.241 \times \frac{C}{\text{wt.-\%}}\right) - \left(1.14 \times \frac{IV}{\text{dl/g}}\right) \quad \text{(Ib)}$$

$$-0.50 \geq \left(0.241 \times \frac{C}{\text{wt.-\%}}\right) - \left(1.14 \times \frac{IV}{\text{dl/g}}\right) \quad \text{(Ic)}$$

$$-1.20 \geq \left(0.241 \times \frac{C}{\text{wt.-\%}}\right) - \left(1.14 \times \frac{IV}{\text{dl/g}}\right) \quad \text{(Id)}$$

wherein
C is the comonomer content in wt.-% of the xylene cold soluble (XCS) fraction of the heterophasic polypropylene composition (HECO1), and
IV is the intrinsic viscosity in dl/g of the xylene cold soluble (XCS) fraction of the heterophasic polypropylene composition (HECO1).

As can be taken from the above inequations, the values of the comonomer content and the intrinsic viscosity are used dimensionless as they are divided by the respective unit, i.e. by "wt.-%" and "dl/g", respectively.

Further it is preferred that the elastomeric propylene copolymer (E) has a rather broad molecular weight distribution. Thus it is preferred that the xylene cold soluble (XCS) fraction of the heterophasic polypropylene composition (HECO1) is featured by a rather high molecular weight distribution (Mw/Mn). Preferably the xylene cold soluble (XCS) fraction of the heterophasic polypropylene composition (HECO1) has a molecular weight distribution (Mw/Mn) of at least 3.5, more preferably at least 3.8 and still more preferably at least 4.0. On the other hand the molecular weight distribution (Mw/Mn) should be not too broad. Therefore, it is preferred that the molecular weight distribution (Mw/Mn) of the xylene cold soluble (XCS) fraction of the heterophasic polypropylene composition (HECO1) is less than 10.0, more preferably less than 8.0. For example, the molecular weight distribution (Mw/Mn) of the xylene cold soluble (XCS) fraction of the heterophasic polypropylene composition (HECO1) is from 3.5 to 10.0, more preferably from 3.8 to 8.0, yet more preferably from 4.0 to 7.0.

Preferably the heterophasic polypropylene composition (HECO1) has a melt flow rate $MFR_2$ (230° C.) measured according to ISO 1133 in the range of above 0.5 to 20 g/10 min, more preferably in the range of above 0.5 to 10 g/10 min, like in the range of 0.5 to 8.3 g/10 min.

As mentioned above the heterophasic polypropylene composition (HECO1) comprises the propylene homopolymer (H-PP1) and the elastomeric propylene copolymer (E). Accordingly the comonomers of the heterophasic polypropylene composition (HECO1) are preferably the same as for the elastomeric propylene copolymer (E). Thus the heterophasic polypropylene composition (HECO1) comprises apart from propylene comonomers such as ethylene and/or $C_4$ to $C_{12}$ α-olefins, in particular ethylene and/or $C_4$ to $C_{10}$ α-olefins, e.g. 1-butene and/or 1-hexene. Preferably the heterophasic polypropylene composition (HECO1) comprises, especially consists of, monomers copolymerizable with propylene from the group consisting of ethylene, 1-butene and 1-hexene. More specifically the heterophasic polypropylene composition (HECO1) comprises-apart from propylene—units derivable from ethylene and/or 1-butene. Thus in an especially preferred embodiment the heterophasic polypropylene composition (HECO1) comprises units derivable from ethylene and propylene only.

The comonomer content, preferably the ethylene content, of the heterophasic polypropylene composition (HECO1) preferably is below 10.0 wt.-%, more preferably not more than 8.0 wt.-%, still more preferably in the range of 2.0 to 10.0 wt.-%, yet more preferably in the range of more than 3.0 to 8.0 wt.-%.

The heterophasic polypropylene composition (HECO1) as defined in the instant invention may contain up to 5.0 wt.-% additives, like α-nucleating agents and antioxidants, as well as slip agents and antiblocking agents. Preferably the additive content is below 3.0 wt.-%, like below 1.0 wt.-%

Preferably the heterophasic polypropylene composition (HECO1) comprises an α-nucleating agent. Even more preferred the present invention is free of β-nucleating agents. Accordingly, the α-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", 5th edition, 2001 of Hans Zweifel, pages 871 to 873.

Preferably the heterophasic polypropylene composition (HECO1) contains up to 5 wt.-% of the α-nucleating agent. In a preferred embodiment, the heterophasic polypropylene composition (HECO1) contains not more than 200 ppm, more preferably of 1 to 200 ppm, more preferably of 5 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

It is especially preferred the heterophasic polypropylene composition (HECO1) contains a vinylcycloalkane, like vinylcyclohexane (VCH), polymer and/or vinylalkane polymer. In one specific embodiment the heterophasic polypropylene composition (HECO1) contains a vinylcycloalkane, like vinylcyclohexane (VCH), polymer and/or vinylalkane polymer. Preferably the vinylcycloalkane is vinylcyclohexane (VCH) polymer is introduced into the the heterophasic polypropylene composition (HECO1) by the BNT technology.

The instant heterophasic polypropylene composition (HECO1) is preferably obtained by a specific process. Accordingly the heterophasic polypropylene composition (HECO1) is preferably obtained by a sequential polymerization process in the first reactor ($1^{st}$ R) and optionally in a second reactor ($2^{nd}$ R) the propylene homopolymer (H-PP) is produced, whereas in the third reactor ($3^{rd}$ R) the elastomeric propylene copolymer (E) of the heterophasic propylene copolymer (HECO1) is obtained.

The term "sequential polymerization process" indicates that the heterophasic polypropylene composition (HECO1) is produced in at least two reactors, preferably in three reactors, connected in series. Accordingly the present process comprises at least a first reactor ($1^{st}$ R), an optional second reactor ($2^{nd}$ R), and a third reactor ($3^{rd}$ R). The term "polymerization reactor" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization reactors.

As stated above in the first ($1^{st}$ R) or in the first two reactors ($1^{st}$ and $2^{nd}$ R's) the matrix (M), i.e. the propylene homopolymer (H-PP) is produced. In case two reactors are used for the preparation of the propylene homopolymer (H-PP), in each reactor a propylene homopolymer fraction (H-PP1) and (H-PP2) is produced which may differ in the melt flow rate as indicated above. Preferably the first propylene homopolymer fraction (H-PP1) is produced in the first reactor ($1^{st}$ R) whereas the second propylene homopolymer fraction (H-PP2) is produced in the second reactor ($2^{nd}$ R).

Preferably the weight ratio between the first propylene homopolymer fraction (H-PP1) and second propylene homopolymer fraction (H-PP2) is 20/80 to 80/20, more preferably 30/70 to 70/30, yet more preferably 40/60 to 60/40.

After the first reactor ($1^{st}$ R) or optional second reactor ($2^{nd}$ R) the matrix (M), i.e. the propylene homopolymer (H-PP), of the heterophasic propylene copolymer (HECO1), is obtained. This matrix (M) is subsequently transferred into the third reactor ($3^{rd}$ R) in which the elastomeric propylene copolymer (E) is produced and thus the heterophasic propylene copolymer (HECO1) of the instant invention is obtained.

Preferably the weight ratio between the matrix (M), i.e. the propylene homopolymer (H-PP), and the elastomeric propylene copolymer (E) [(M)/(E)] is 85/15 to 60/40, more preferably 83/17 to below 62/38.

The first reactor ($1^{st}$ R) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor ($2^{nd}$ R), and the third reactor ($3^{th}$ R) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor ($1^{st}$ R) is a slurry reactor (SR), like loop reactor (LR), whereas the second reactor ($2^{nd}$ R), and third reactor ($3^{th}$ R) are gas phase reactors (GPR). Accordingly for the instant process at least two, preferably two or three polymerization reactors, namely a slurry reactor (SR), like loop reactor (LR), a first gas phase reactor (GPR-1), and optionally a second gas phase reactor (GPR-2) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the propylene copolymer, i.e. the heterophasic propylene copolymer (HECO1), as defined above the conditions for the first reactor ($1^{st}$ R), i.e. the slurry reactor (SR), like a loop reactor (LR), may be as follows:
- the temperature is within the range of 40° C. to 110° C., preferably between 60° C. and 100° C., like 68 to 95° C.,
- the pressure is within the range of 20 bar to 80 bar, preferably between 40 bar to 70 bar,
- hydrogen can be added for controlling the molar mass in a manner known per se.

Subsequently, the reaction mixture from the first reactor ($1^{st}$ R) is transferred to the second reactor ($2^{nd}$ R), i.e. gas phase reactor (GPR-1), whereby the conditions are preferably as follows:
- the temperature is within the range of 50° C. to 130° C., preferably between 60° C. and 100° C.,
- the pressure is within the range of 5 bar to 50 bar, preferably between 15 bar to 35 bar,
- hydrogen can be added for controlling the molar mass in a manner known per se.

The condition in the third reactor ($3^{th}$ R), preferably in the second gas phase reactor (GPR-2), is similar to the second reactor ($2^{nd}$ R).

The residence time can vary in the three reactor zones.

In one embodiment of the process for producing the propylene copolymer, i.e. the heterophasic propylene copolymer (HECO1), the residence time the first reactor ($1^{st}$ R), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first reactor ($1^{st}$ R), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the propylene copolymer, i.e. the heterophasic propylene copolymer (HECO1), is obtained by a sequential polymerization process, as described above, in the presence of a catalyst system comprising a Ziegler-Natta catalyst and optionally an external donor, preferably a catalyst system comprising three components, namely as component (i) a Ziegler-Natta procatalyst, and optionally as component (ii) an organometallic cocatalyst and as component (iii) an external donor represented by formula (IIIa) or (IIIb), preferably represented by formula (IIIa).

In the following the used catalyst is defined in more detail.

Preferably component (i) is a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

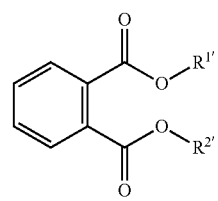

(I)

wherein $R^{1\prime}$ and $R^{2\prime}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$.

The procatalyst is produced as defined for example in the patent applications WO 87/07620, WO 92/19653, WO 92/19658 and EP0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl, and n is 1 to 6, is contacting with $TiCl_4$ to form a titanised carrier, followed by the steps of adding to said titanised carrier (i) a dialkylphthalate of formula (I) with $R^{1'}$ and $R^{2'}$ being independently at least a $C_5$-alkyl, like at least a $C_8$-alkyl, or preferably (ii) a dialkylphthalate of formula (I) with $R^{1'}$ and $R^{2'}$ being the same and being at least a $C_5$-alkyl, like at least a $C_8$-alkyl, or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

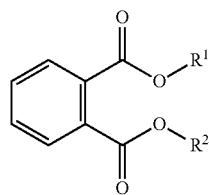

(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic propylene copolymer (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \qquad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (IIIb) is diethylaminotriethoxysilane $[Si(OCH_2CH_3)_3(N(CH_2CH_3)_2]$.

More preferably the external donor is selected from the group consisting of diethylaminotriethoxysilane $[Si(OCH_2CH_3)_3(N(CH_2CH_3)_2]$, diethylaminotriethoxysilane

[Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof.

Most preferably the external donor is diethylaminotriethoxysilane [Si(OCH$_2$CH$_3$)$_3$(N(CH$_2$CH$_3$)$_2$] or dicyclopentyl dimethoxy silane [Si(OCH$_3$)$_2$(cyclo-pentyl)$_2$].

If desired the Ziegler-Natta procatalyst is modified by polymerizing a vinyl compound in the presence of the catalyst system, comprising the special Ziegler-Natta procatalyst (component (i)), the external donor (component (iii)) and optionally the cocatalyst (component (ii)), wherein the vinyl compound has the formula:

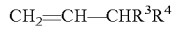

wherein R$^3$ and R$^4$ together form a 5- or 6-membered saturated, unsaturated or aromatic ring or independently represent an alkyl group comprising 1 to 4 carbon atoms. The so modified catalyst is used for the preparation of the heterophasic propylene copolymer (HECO1), according to this invention (BNT technology).

The additives as stated above are added to the heterophasic propylene copolymer (HECO1) preferably by extruding. For mixing/extruding, a conventional compounding or blending apparatus, e.g. a Banbury mixer, a 2-roll rubber mill, Bussco-kneader or a twin screw extruder may be used. The polymer materials recovered from the extruder are usually in the form of pellets.

Composition

The heterophasic propylene copolymer (HECO1) according to this invention is especially used as an additional component in a composition especially used for manufacture of injection molded articles, like injection molded articles in the automobile industry. Thus the present invention is also directed to a composition comprising the heterophasic propylene copolymer (HECO1) in amounts to 5 to 30 wt.-% based on said composition, wherein the remaining part to 100 wt.-% constitute other polyolefins and additives.

Thus the present invention is especially directed to a composition comprising a polyolefin (PO), the instant heterophasic polypropylene composition (HECO1), especially the heterophasic polypropylene copolymer (HECO1) according to any one of the claims 1 to 8, and optionally a inorganic filler (F), wherein the weight ratio between the polyolefin (PO) and the heterophasic polypropylene copolymer (HECO1) [PO/HECO1] is in the range of 2/1 to 8/1, preferably in the range of 3/1 to 7/1, more preferably in the range of 4/1 to 6.5/1.

Preferably the composition comprises
(a) 50 to 90 wt.-%, more preferably 60 to 85 wt.-%, still more preferably 70 to 80 wt.-%, of the polyolefin (PO),
(b) 5 to 30 wt.-%, more preferably 8 to 25 wt.-%, still more preferably 12 to 20 wt.-%, of the heterophasic polypropylene copolymer (HECO1), and
(c) 5 to 30 wt.-%, more preferably 8 to 25 wt.-%, still more preferably 12 to 20 wt.-%, of the inorganic filler (F).
based on the total weight of the polyolefin (PO), the heterophasic polypropylene copolymer (HECO1) and the inorganic filler (F) together, preferably based on the total composition.

The polyolefin (PO) differs from the heterophasic polypropylene copolymer (HECO1) according to the present invention. Accordingly the polyolefin (PO) is not regarded as a heterophasic polypropylene copolymer (HECO1) as defined herein. The polyolefin (PO) is preferably a polyethylene or a polypropylene. Even more preferred the polyolefin (PO) is a polypropylene, i.e. is selected from the group consisting of propylene homopolymer, propylene copolymer, heterophasic propylene copolymer, and mixtures thereof. Preferably the polyolefin is a heterophasic polypropylene composition (HECO2), i.e. a heterophasic polypropylene copolymer being different to the heterophasic polypropylene copolymer (HECO1) as defined in the instant invention.

The term heterophasic propylene copolymer is understood as known in the technical field and defined above. Accordingly the heterophasic propylene copolymer comprises a polymer matrix, like a (semi)crystalline polypropylene, in which the amorphous material, like an elastomeric propylene copolymer, is dispersed, preferably in form of inclusions. Further the term "propylene copolymer" is not regarded as a heterophasic system. In other words the propylene copolymer according to this invention is monophasic, i.e. does not contain two or more phases, which would be for instance distinguishable by high resolution microscopy, like electron microscopy or atomic force microscopy, or by dynamic mechanical thermal analysis (DMTA).

As mentioned above the polyolefin (PO) is preferably the heterophasic propylene copolymer (HECO2). The heterophasic propylene copolymer (HECO2) according to this invention has preferably a melt flow rate MFR$_2$ (230° C.) measured according to ISO 1133 in the range of 3.0 to 120 g/10 min, more preferably in the range of 8.0 to 100 g/10 min, still more preferable in the range of 10.0 to 50 g/10 min.

The heterophasic propylene copolymer (HECO2) according to this invention preferably comprises
(a) a polypropylene matrix (M-PP2) and
(b) an elastomeric propylene copolymer (E-PP2) comprising units derived from
  propylene and
  ethylene and/or C$_4$ to C$_{12}$ α-olefin.

Preferably the propylene content in the heterophasic propylene copolymer (HECO2) is 70.0 to 92.0 wt.-%, more preferably 75.0 to 90.0 wt.-%, based on the total heterophasic propylene copolymer (HECO2), more preferably based on the amount of the polymer components of the heterophasic propylene copolymer (HECO2), yet more preferably based on the amount of the polypropylene matrix (M-PP2) and the elastomeric propylene copolymer (E-PP2) together. The remaining part constitutes the comonomers, preferably ethylene.

As defined herein a heterophasic propylene copolymer (HECO2) comprises as polymer components only the polypropylene matrix (M-PP2) and the elastomeric copolymer (E-PP2). In other words the heterophasic propylene copolymer (HECO2) may contain further additives but no other polymer in an amount exceeding 5 wt.-%, more preferably exceeding 3 wt.-%, like exceeding 1 wt.-%, based on the total heterophasic propylene copolymer (HECO2), more preferably based on the polymers present in the heterophasic propylene copolymer (HECO2). One additional polymer which may be present in such low amounts is a polyethylene which is a reaction product obtained by the preparation of the heterophasic propylene copolymer (HECO2). Accordingly it is in particular appreciated that a heterophasic propylene copolymer (HECO2) as defined in the instant invention contains only a polypropylene matrix (M-PP2), an elastomeric propylene copolymer (E-PP2) and optionally a polyethylene in amounts as mentioned in this paragraph. Further, throughout the present invention the xylene cold insoluble (XCI) fraction represents the polypropylene matrix (M-PP2) and optionally the polyethylene of the heterophasic propylene copolymer (HECO2) whereas the xylene cold soluble (XCS) fraction represents the elastomeric part of the heterophasic propylene copolymer (HECO2), i.e. the elastomeric propylene copolymer (E-PP2).

Accordingly the polypropylene matrix (M-PP2) content, i.e. the xylene cold insoluble (XCI) content, in the heterophasic propylene copolymer (HECO2) is preferably in the range of 50.0 to 80.0 wt.-%, more preferably in the range of 55.0 to 78.0 wt.-%. In case polyethylene is present in the heterophasic propylene copolymer (HECO2), the values for the polypropylene matrix (M-PP1) content but not for the xylene cold insoluble (XCI) content may be a bit decreased.

On the other hand the elastomeric propylene copolymer (E-PP2) content, i.e. the xylene cold soluble (XCS) content, in the heterophasic propylene copolymer (HECO2) is preferably in the range of 20.0 to 50.0 wt.-%, more preferably in the range of 22.0 to 45.0 wt.-%.

The polypropylene matrix (M-PP2) is preferably a random propylene copolymer (R-PP2) or a propylene homopolymer (H-PP2), the latter especially preferred.

Accordingly the comonomer content of the polypropylene matrix (M-PP2) is equal or below 1.0 wt.-%, yet more preferably not more than 0.8 wt.-%, still more preferably not more than 0.5 wt.-%, like not more than 0.2 wt.-%.

As mentioned above the polypropylene matrix (M-PP2) is preferably a propylene homopolymer (H-PP2).

In case the polypropylene matrix (M-PP2) is a random propylene copolymer (R-PP2) it is appreciated that the random propylene copolymer (R-PP2) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP2) according to this invention comprises, especially consists of, monomers copolymerizable with propylene from the group consisting of ethylene, 1-butene and 1-hexene. More specifically the random propylene copolymer (R-PP2) of this invention comprises-apart from propylene-units derivable from ethylene and/or 1-butene. In a preferred embodiment the random propylene copolymer (R-PP2) comprises units derivable from ethylene and propylene only.

Additionally it is appreciated that the random propylene copolymer (R-PP2) has preferably a comonomer content in the range of more than 0.3 to 1.0 wt.-%, more preferably in the range of more than 0.3 to 0.8 wt.-%, yet more preferably in the range of more than 0.3 to 0.7 wt.-%.

The term "random" indicates that the comonomers of the random propylene copolymer (R-PP2) are randomly distributed within the propylene copolymer. The term random is understood according to IUPAC (Glossary of basic terms in polymer science; IUPAC recommendations 1996).

The polypropylene matrix (M-PP2) of the heterophasic propylene copolymer (HECO2), preferably the polypropylene matrix (M-PP2) being the propylene homopolymer (H-PP2), can be multimodal or bimodal in view of the molecular weight.

The expression "multimodal" or "bimodal" used throughout the present invention refers to the modality of the polymer, i.e.

the form of its molecular weight distribution curve, which is the graph of the molecular weight fraction as a function of its molecular weight, and/or
the form of its comonomer content distribution curve, which is the graph of the comonomer content as a function of the molecular weight of the polymer fractions.

As will be explained below, the heterophasic propylene copolymers as well their individual components (matrix and elastomeric copolymer) can be produced by blending different polymer types, i.e. of different molecular weight and/or comonomer content. However, it is preferred that the heterophasic propylene copolymers as well their individual components (matrix and elastomeric copolymer) are produced in a sequential step process, using reactors in serial configuration and operating at different reaction conditions. As a consequence, each fraction prepared in a specific reactor will have its own molecular weight distribution and/or comonomer content distribution.

Further it is appreciated that the polypropylene matrix (M-PP2) of the heterophasic propylene copolymer (HECO2) has a moderate melt flow $MFR_2$ (230° C.). As stated above the xylene cold insoluble (XCI) fraction of an heterophasic propylene copolymer (HECO2) is essentially identical with the matrix of said heterophasic propylene copolymer (HECO2). Accordingly the melt flow rate $MFR_2$ (230° C.) of the polypropylene matrix (M-PP2) equates with the melt flow rate $MFR_2$ (230° C.) of the xylene cold insoluble (XCI) fraction of the heterophasic propylene copolymer (HECO2). Accordingly, it is preferred that the xylene cold insoluble (XCI) fraction of the heterophasic propylene copolymer (HECO2) has a melt flow rate $MFR_2$ (230° C.) measured according to ISO 1133 of 10.0 to 150 g/10 min, more preferably of 15.0 to 100 g/10 min, still more preferably of 50.0 to 80.0 g/10 min.

The second component of the heterophasic propylene copolymer (HECO2) is the elastomeric propylene copolymer (E-PP2).

The elastomeric propylene copolymer (E-PP2) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and at least another α-olefin selected form the group consisting of 1-butene, 1-pentene, 1-hexene, 1-heptene and 1-octene. The elastomeric propylene copolymer (E-PP2) may additionally contain units derived from a conjugated diene, like butadiene, or a non-conjugated diene, however, it is preferred that the elastomeric propylene copolymer (E-PP2) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane. Multi-ring alicyclic fused and bridged ring dienes are also suitable including tetrahydroindene, methyltetrahydroindene, dicyclopentadiene, bicyclo (2,2,1) hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene.

Preferred non-conjugated dienes are 5-ethylidene-2-norbornene, 1,4-hexadiene and dicyclopentadiene.

Accordingly the elastomeric propylene copolymer (E-PP2) comprises at least units derivable from propylene and ethylene and may comprise other units derivable from a further α-olefin as defined in the previous paragraph. However, it is in particular preferred that elastomeric propylene copolymer (E-PP2) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM2) and/ or an ethylene propylene rubber (EPR2) as elastomeric propylene copolymer (E-PP2) is especially preferred, the latter most preferred.

Like the polypropylene matrix (M-PP2) the elastomeric propylene copolymer (E-PP2) can be unimodal or multimodal, like bimodal, the latter being preferred. Concerning the definition of unimodal and multimodal, like bimodal, it is referred to the definition above.

Like the polypropylene matrix (M-PP2) the elastomeric propylene copolymer (E-PP2) can be unimodal or multimodal, like bimodal, the latter being preferred. Concerning the definition of unimodal and multimodal, like bimodal, it is referred to the definition above.

In the present invention the content of units derivable from propylene in the elastomeric propylene copolymer (E-PP2) equates with the content of propylene detectable in the xylene cold soluble (XCS) fraction. Accordingly the propylene detectable in the xylene cold soluble (XCS) fraction ranges from 40.0 to 75.0 wt.-%, more preferably 45.0 to 70.0 wt.-%. Thus in a specific embodiment the elastomeric propylene copolymer (E-PP2), i.e. the xylene cold soluble (XCS) fraction, comprises from 25.0 to 60.0 wt.-%, more preferably 30.0 to 55.0 wt.-%, units derivable from comonomers other than propylene, like ethylene. Preferably the elastomeric propylene copolymer (E-PP2) is an ethylene propylene non-conjugated diene monomer polymer (EPDM2) or an ethylene propylene rubber (EPR2), the latter especially preferred, with a propylene and/or ethylene content as defined in this paragraph.

A further preferred requirement of the present invention is that the intrinsic viscosity (IV) of the xylene cold soluble (XCS) fraction of the heterophasic propylene copolymer (HECO2) is rather high. Rather high values of intrinsic viscosity (IV) improve the impact strength. Accordingly it is appreciated that the intrinsic viscosity of the xylene cold soluble (XCS) fraction of the heterophasic propylene copolymer (HECO-1) is above 2.0 dl/g, more preferably at least 2.2 dl/g. On the other hand the intrinsic viscosity (IV) should be not too high otherwise the flowability is decreased. Thus the intrinsic viscosity of the xylene cold soluble (XCS) fraction of the heterophasic propylene copolymer (HECO2) is preferably in the range of 2.0 to 4.0 dl/g, more preferably in the range 2.2 to 3.5 dl/g, like 2.3 to below 3.3 dl/g.

The heterophasic propylene copolymer (HECO2) preferably does not comply with the inequation (1) of the heterophasic propylene copolymer (HECO1). Accordingly the heterophasic polypropylene composition (HECO2) preferably fulfills the inequation (II), more preferably inequation (IIa), yet more preferably inequation (IIb), still more preferably inequation (IIb), still yet more preferably inequation (IIc), $$0.30 < \left(0.241 \times \frac{c}{wt.\text{-}\%}\right) - \left(1.14 \times \frac{IV}{dl/g}\right) \quad \text{(II)}$$

$$1.00 < \left(0.241 \times \frac{c}{wt.\text{-}\%}\right) - \left(1.14 \times \frac{IV}{dl/g}\right) \quad \text{(IIa)}$$

$$2.50 < \left(0.241 \times \frac{c}{wt.\text{-}\%}\right) - \left(1.14 \times \frac{IV}{dl/g}\right) \quad \text{(IIb)}$$

$$4.00 < \left(0.241 \times \frac{c}{wt.\text{-}\%}\right) - \left(1.14 \times \frac{IV}{dl/g}\right) \quad \text{(IIc)}$$

wherein

C is the comonomer content in wt.-% of the xylene cold soluble (XCS) fraction of the heterophasic polypropylene composition (HECO2), and IV is the intrinsic viscosity in dl/g of the xylene cold soluble (XCS) fraction of the heterophasic polypropylene composition (HECO2).

As can be taken from the above inequations, the values of the comonomer content and the intrinsic viscosity are used dimensionless as they are divided by the respective unit, i.e. by "wt.-%" and "dl/g", respectively.

Preferably the heterophasic propylene copolymer (HECO2) is α-nucleated. Even more preferred the present invention is free of β-nucleating agents. Concerning the preferred α-nucleating agents reference is made to the information provided above when discussing the heterophasic propylene copolymer (HECO2).

Accordingly the heterophasic polypropylene composition (HECO2) preferably contains up to 5 wt.-% of the α-nucleating agent. In a preferred embodiment, the heterophasic polypropylene composition (HECO2) contains not more than 200 ppm, more preferably of 1 to 200 ppm, more preferably of 5 to 100 ppm of a α-nucleating agent, in particular selected from the group consisting of dibenzylidenesorbitol (e.g. 1,3: 2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

It is especially preferred the heterophasic polypropylene composition (HECO2) contains a vinylcycloalkane, like vinylcyclohexane (VCH), polymer and/or vinylalkane polymer. In one specific embodiment the heterophasic polypropylene composition (HECO2) contains a vinylcycloalkane, like vinylcyclohexane (VCH), polymer and/or vinylalkane polymer. Preferably the vinylcycloalkane is vinylcyclohexane (VCH) polymer is introduced into the the heterophasic polypropylene composition (HECO2) by the BNT technology.

Concerning the preparation of the heterophasic polypropylene composition (HECO2) reference is made to the detailed explanation of the preparation of the heterophasic polypropylene composition (HECO1).

In addition to the polymer components the composition optionally comprises an inorganic filler (F) preferably in amounts as indicated above. Preferably the inorganic filler (F) is a phyllosilicate, mica or wollastonite. Even more preferred the inorganic filler (F) is selected from the group consisting of mica, wollastonite, kaolinite, smectite, montmorillonite and talc. The most preferred the inorganic filler (F) is talc.

The inorganic filler (F) preferably has a cutoff particle size d95 [mass percent] of equal or below 20 μm, more preferably in the range of 2.5 to 10 μm, like in the range of 2.5 to 8.0 μm.

Typically the inorganic filler (F) has a surface area measured according to the commonly known BET method with $N_2$ gas as analysis adsorptive of less than 22 m²/g, more preferably of less than 20 m²/g, yet more preferably of less than 18 m²/g. Inorganic fillers (F) fulfilling these requirements are preferably anisotropic inorganic fillers (F), like talc, mica and wollastonite.

Injection Moulded Article

The present invention is further directed to injection moulded articles comprising the heterophasic propylene copolymer (HECO1). Preferably the present invention is directed to injection moulded articles comprising 5 to 30 wt.-%, more preferably 8 to 25 wt.-%, still more preferably 12 to 20 wt.-%, of the heterophasic polypropylene copolymer (HECO1), based on the total weight of the injection molded article.

In a further aspect the present invention is directed to injection moulded articles comprising the composition of the instant invention, i.e. the composition comprising the polyolefin (PO), the heterophasic polypropylene composition (HECO1) and optionally the inorganic filler (F). Preferably the injection molded articles comprises at least 70 wt.-%, more preferably at least 80 wt.-%, still more preferably at least 95 wt.-%, yet more preferably consists, of the instant composition.

Preferred embodiments with regard to the heterophasic polypropylene composition (HECO1) and the composition, respectively, reference is made to the information provided above.

Preferably the injection moulded articles are automotive articles, more preferably injection moulded car interiors and exteriors, like bumpers, side trims, step assists, body panels, spoilers, dashboards, interior trims and the like, especially bumpers.

Uses According to the Invention

The present invention also relates to the use of the heterophasic polypropylene composition (HECO1) or the composition as described above in an automotive application, preferably in an injection molded automotive application, like in a bumper.

Additionally the present invention is directed to the use of the instant heterophasic polypropylene composition (HECO1), preferably as defines in one of the claims 1 to 8, in a composition comprising in addition to said heterophasic polypropylene composition (HECO1) a polyolefin (PO) and optionally a inorganic filler (F) to reduce flow marks of an injection molded article made from said composition. Concerning the individual components, like the heterophasic polypropylene composition (HECO1), the composition, the polyolefin (PO), the inorganic filler (F), etc, reference is made to the information provided above.

Preferably the reduction of flow marks is accomplished in case the mean square error determined on plaques of 210×148×3 mm³ size produced with an injection filling time of 1.5 sec is below 7.4, preferably below 7.0, more preferably below in the range of 1.0 to below 7.4, more preferably in the range of 2.0 to below 7.0, like 2.0 to 6.0.

The invention will now be illustrated by reference to the following non-limiting examples.

EXAMPLES

1. Definitions/Measuring Methods

The following definitions of terms and determination methods apply for the above general description of the invention as well as to the below examples unless otherwise defined.

Calculation of melt flow rate $MFR_2$ (230° C.) of the polymer produced in the GPR 1:

$$MFR(P2) = 10^{\left[\frac{\log(MFR(P))-w(P1)\times\log(MFR(P1))}{w(P2)}\right]}$$

wherein
w(P1) is the weight fraction [in wt.-%] of the polymer produced in the loop reactor,
w(P2) is the weight fraction [in wt.-%] of the polymer produced in the GPR 1,
MFR(P1) is the melt flow rate $MFR_2$ (230° C.) [in g/10 min] of the polymer produced in the loop reactor,
MFR(P) is the total melt flow rate $MFR_2$ (230° C.) [in g/10 min] after GPR1 but before GPR2,
MFR(P2) is the calculated melt flow rate $MFR_2$ (230° C.) [in g/10 min] of the polymer produced in the GPR 1.

$MFR_2$ (230° C.) is measured according to ISO 1133 (230° C., 2.16 kg load).

Comonomer content, especially ethylene content is measured with Fourier transform infrared spectroscopy (FTIR) calibrated with $^{13}$C-NMR. When measuring the ethylene content in polypropylene, a thin film of the sample (thickness about 250 μm) was prepared by hot-pressing. The area of absorption peaks 720 and 733 cm$^{-1}$ for propylene-ethylene-copolymers was measured with Perkin Elmer FTIR 1600 spectrometer. Propylene-1-butene-copolymers were evaluated at 767 cm$^{-1}$.

Calculation of comonomer content of the polymer produced in the GPR 1:

$$\frac{C(P)-w(P1)\times C(P1)}{w(P2)} = C(P2)$$

wherein
w(P1) is the weight fraction [in wt.-%] of the total polymer in the loop reactor,
w(P2) is the weight fraction [in wt.-%] of the polymer produced in the GPR1,
C(P1) is the comonomer content [in wt.-%] in the loop reactor,
C(P) is the total comonomer content [in wt.-%] after GPR1,
C(P2) is the calculated comonomer content [in wt.-%] of the polymer produced in the GPR1.

Calculation of comonomer content of the polymer produced in the GPR 2:

$$\frac{C(P)-w(P1)\times C(P1)}{w(P2)} = C(P2)$$

wherein
w(P1) is the weight fraction [in wt.-%] of the total polymer in the GPR1,
w(P2) is the weight fraction [in wt.-%] of the polymer produced in the GPR2,
C(P1) is the comonomer content [in wt.-%] in the GPR1,
C(P) is the total comonomer content [in wt.-%] after GPR2,
C(P2) is the calculated comonomer content [in wt.-%] of the polymer produced in the GPR2.

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005-07-01, the remaining insoluble part is the xylene cold insoluble (XCI) fraction.

Number average molecular weight ($M_n$), weight average molecular weight ($M_w$) and molecular weight distribution (Mw/Mn) are determined by Gel Permeation Chromatography (GPC) according to the following method:

The weight average molecular weight Mw and the molecular weight distribution (Mw/Mn), wherein Mn is the number average molecular weight and Mw is the weight average molecular weight is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL, of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Flexural Modulus was determined in 3-point-bending according to ISO 178 on injection molded specimens of 80×10×4 mm prepared in accordance with ISO 294-1:1996. The measurement is done after 96 h conditioning time of the specimen.

Tensile Modulus; Tensile stress at break were measured according to ISO 527-2 (cross head speed=1 mm/min; 23° C.) using injection molded specimens as described in EN ISO 1873-2 (dog bone shape, 4 mm thickness). The measurement is done after 96 h conditioning time of the specimen.

Flow Marks

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:

1. Image Recording

The basic principle of the measurement system is to illuminate the plates with a defined light source (LED) in a closed environment and to record an image with a CCD-camera system. A schematic setup is given in Figure 1.

2. Image Analysis

The specimen is floodlit from one side and the upwards reflected portion of the light is deflected via two mirrors to a CCD-sensor. The such created grey value image is analyzed in lines. From the recorded deviations of grey values the mean square error (MSE) is calculated allowing a quantification of surface quality, i.e. the larger the MSE value the more pronounced is the surface defect.

Generally, for one and the same material, the tendency to flow marks increases when the injection speed is increased.

For this evaluation plaques 210×148×3 mm$^3$ with grain VW K50 and a filmgate of 1.4 mm were used and were produced with a filling time of 1.5 sec (MSE 1.5).

Further conditions:
Melt temperature 240° C.
Mould temperature 30° C.
Dynamic pressure 10 bar hydraulic The smaller the MSE value is at a certain filling time, the smaller is the tendency for flow marks.

Cutoff particle size (195 (Sedimentation) is calculated from the particle size distribution [mass percent] as determined by gravitational liquid sedimentation according to ISO 13317-3 (Sedigraph)

Specific surface area is determined as the BET surface according to DIN 66131/2 ($N_2$).

2. Examples

The catalyst used in the polymerization process for examples IE1 to 1E4 and CE1 to CE3 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C.

At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) and diethylaminotriethoxysilane $[Si(OCH_2CH_3)_3(N(CH_2CH_3)_2]$ (U-donor), respectively, were used. The aluminium to donor ratio is indicated in table 1.

Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307.

Polymerization

Examples IE1 and IE7 were accomplished on a 21.3 l autoclave equipped with control valves for dosing the reactor with monomers, hydrogen and for flashing. The dosage of monomers and hydrogen into the reactor was monitored by flow controllers and also by monitoring the mass of their respective reservoirs. The temperature of the reactors was controlled via cooling/heating of water in the double jacket around the reactors including sensors in both the top and bottom of the reactor. Helical stirrers with magnetic coupling were used for effective mixing inside the reactor and the stirring rates could be varied during the course of the reaction. The entire process was programmed ahead of time, executed and monitored by work station computers outside of the reactor cabins.

Bulk

The reactor is initially purged with propylene and then filled with 5250 g of propylene and 6 liters of Hydrogen for the pre-polymerisation. The catalyst as defined above (15.3 wt.-% suspension in a mineral oil slurry) was mixed with a solution of TEAL and U or D donor at a set TEAL/Donor ratio of 6 mol/mol for 5 minutes before being added to the reactor. The catalyst loading vessel is then flushed with 250 g propylene to ensure all of the catalyst mixture is added to the reactor. The reactor then undergoes prepolymerisation at 23° C. for 6 minutes while stirring at 350 rpm.

Subsequently, the reactor is heated up to 85° C. to initiate bulk conditions. While in transition the desired amount of hydrogen is added to the reactor via a flow controller. Hydrogen is always added in bulk and not added continuously during the reaction. Once the desired reactor conditioners are reached, the reactor is held at a constant pressure by dosing with propylene. This transition time to reach the bulk conditions was typically ~19 minutes. After the specified bulk residence time, the reactor is purged to 0.5 bar with a stirring speed of 100 rpm to continue to a gas phase step. Materials IE 1 to 4 and CE1 proceeded immediately to GPR2, while materials CE 2 and 3 followed proceeded to GPR1.

GPR1 (when applicable)

Once the purge pressure of 0.5 bar is achieved, the stirring speed of the reactor is increased to 350 rpm and the target amounts of propylene and hydrogen for GPR 1 are added to the reactor as the pressure and temperature are increased to 34 bar and 85° C., respectively. The transition time between bulk and GPR1 was typically ~19 minutes. Once the target temperature was achieved, pressure was held constant by dosing with propylene. The amount of polymer being produced could be monitored by measuring the amount of propylene added during the course of the reaction. After a desired split level was reached, the reactor was either purged to 0.5 bar at a stirring rate of 100 rpm for additional gas phase steps.

GPR 2

Once the desired purge pressure (0.5 bar) was achieved, the transition to the final gas phase (GPR 1) began. The stirring rate of the reactor was increased to 350 rpm and the reactor was dosed with propylene, ethylene and hydrogen as the temperature and pressure were increased to the desired levels (see Table 1a and b). The transition time between loop and GPR2 was typically between 8 to 10 minutes. The comonomers were added to maintain a desired gas ratio. Once the reactor reached the desired temperature, the pressure was held constant at the desired level by dosing with ethylene/propylene at the appropriate gas ratio. The amount of polymer being produced could be monitored by measuring the amount of propylene and ethylene added during the course of the reaction. After a desired split level was reached, the reactor followed the termination procedure outlined below.

Reaction Termination

After the reaction is completed the stirring speed is reduced to 100 rpm and the gas mixture purged from the reactor to 0 barg. Residual gases are removed from the reactor (as well as the polymer particles) by treating the reactor with several vacuum cycles. This cycle involves put the reactor under vacuum for several minutes, filling up to ambient pressures with nitrogen and then repeating the process several times. The product is then safely removed from the reactor. The analytics of the prepared samples can be gathered from Table 1.

Post Reactor treatment

All polymer powders in were first compounded using a TSE16TC extruder with 0.05 wt % calcium stearate, 0.05 wt % DHT, 0.25 wt % Irganox B225 and 0.5 wt % Talc 4.5 Jetfine 3CA and then sent off for base mechanical testing (Table 1a and b)

The polymer powders were then mixed with HECO2, Talc and a Carbonblack Masterbatch and extruded using a PRISM TSE 24 twin screw extruder with an L/D ratio of 30:1 and two sets of kneading blocks in the screw configuration using a melt temperature profile between 200 and 240° C.

TABLE 1a

Preparation of heterophasic polypropylenes (HECO1) use

|  |  | IE1 | IE2 | IE3 | IE4 |
|---|---|---|---|---|---|
| Donor type | [—] | U | U | D | U |
| TEAL/D | [mol/mol] | 6 | 6 | 6 | 6 |
| Loop |  |  |  |  |  |
| $H_2$ amount | [mol.-%] | 1.54 | 1.55 | 3.89 | 1.54 |
| Temperature | [° C.] | 85 | 85 | 85 | 85 |
| Pressure | [barg] | 43.7 | 43.7 | 51.5 | 44.0 |
| $MFR_2$ | [g/10 min] | 98 | 98 | 88 | 98 |
| Split | [wt.-%] | 74.8 | 74.8 | 73.0 | 74.5 |
| 1. Gas phase |  |  |  |  |  |
| $H_2$ amount | [mol.-%] |  |  |  |  |
| Temperature | [° C.] |  |  |  |  |
| Pressure | [barg] |  |  |  |  |
| $MFR_2$ | [g/10 min] |  |  |  |  |
| Split | [wt.-%] |  |  |  |  |
| 2. Gas phase |  |  |  |  |  |
| $H_2$ amount | [mol.-%] | 0.00000 | 0.00000 | 0.00009 | 0.00017 |
| $C_2/C_3$ | [mol/kmol] | 123 | 241 | 378 | 125 |
| Temperature | [° C.] | 85 | 85 | 85 | 85 |
| Pressure | [barg] | 25 | 25 | 25 | 25 |
| Split | [wt.-%] | 25.2 | 25.2 | 27.0 | 25.5 |
| Product |  |  |  |  |  |
| $MFR_2$ | [g/10 min] | 8.3 | 16.3 | 10.9 | 17.5 |
| $MFR_2$ of XCI | [g/10 min] | 98 | 90 | 80 | 89 |
| XCS | [wt.-%] | 19.2 | 21.4 | 23.3 | 17.6 |
| IV of XCS | [dl/g] | 8.0 | 4.9 | 6.0 | 4.1 |
| C2 of XCS | [wt.-] | 17.2 | 24.4 | 24.5 | 20.2 |
| Mw/Mn of XCS | [—] | 4.7 | 4.3 | 3.6 | 4.2 |
| FM | [MPa] | 1282 | 1195 | 1128 | 1220 |

FM Flexural modulus

TABLE 1b

Preparation of heterophasic polypropylenes (HECO1) used

|  |  | CE1 | CE2 | CE3 |
|---|---|---|---|---|
| Donor type | [—] | U | U | U |
| TEAL/D | [mol/mol] | 6 | 6 | 6 |
| Loop |  |  |  |  |
| $H_2$ amount | [mol.-%] | 1.55 | 2.10 | 2.10 |
| Temperature | [° C.] | 85 | 85 | 85 |
| Pressure | [barg] | 43.7 | 45.2 | 45.2 |
| $MFR_2$ | [g/10 min] | 98 | 108 | 108 |
| Split/wt % | [wt.-%] | 73.5 | 56.7 | 49.7 |
| 1. Gas phase |  |  |  |  |
| $H_2$ amount | [mol.-%] |  | 4.18 | 4.59 |
| Temperature | [° C.] |  | 85 | 85 |
| Pressure | [barg] |  | 34 | 34 |

TABLE 1b-continued

Preparation of heterophasic polypropylenes (HECO1) used

|  |  | CE1 | CE2 | CE3 |
|---|---|---|---|---|
| MFR$_2$ | [g/10 min] |  | 107 | 107 |
| Split | [wt.-%] |  | 19.9 | 17.4 |
| 2. Gas phase |  |  |  |  |
| H$_2$ amount | [mol.-%] | 0.00014 | 0.00015 | 0.02432 |
| C$_2$/C$_3$ | [mol/kmol] | 536 | 709 | 420 |
| Temperature | [° C.] | 85 | 85 | 85 |
| Pressure | [barg] | 25 | 25 | 22 |
| Split | [wt.-%] | 26.5 | 23.4 | 32.9 |
| Product |  |  |  |  |
| MFR$_2$ | [g/10 min] | 16.8 | 19.0 | 23.7 |
| MFR$_2$ of XCI | [g/10 min] | 90 | 99 | 98 |
| XCS | [wt.-%] | 22.3 | 17.5 | 26.3 |
| IV of XCS | [dl/g] | 6.2 | 8.2 | 3.5 |
| C2 of XCS | [wt.-] | 38.8 | 49.5 | 30.6 |
| Mw/Mn of XCS | [—] | 4.4 | 6.4 | 3.6 |
| FM | [MPa] | 1212 | 1377 | 1060 |

FM Flexural modulus

TABLE 2

The heterophasic polypropylenes (HECO2) used

|  |  | HECO 2 |
|---|---|---|
| MFR | [g/10 min] | 11 |
| MFR of XCI | [g/10 min] | 55 |
| XCS | [wt %] | 30.0 |
| C2 total | [wt %] | 10.5 |
| C2 in XCS | [wt %] | 34 |
| IV of XCS | [dl/g] | 3.1 |

"HECO 2" is the commercial product EE050AE of Borealis AG
"Talc" is the commercial product Steamic T1CA of Luzenac TABLE 3a Compositions

|  |  | Example* | | | |
|---|---|---|---|---|---|
|  |  | IE1 | IE2 | IE3 | IE4 |
| HECO 1 | [wt %] | 15 | 15 | 15 | 15 |
| HECO 2 | [wt %] | 70 | 70 | 70 | 70 |
| Talc | [wt %] | 13 | 13 | 13 | 13 |
| MFR | [g/10 min] | 11.2 | 13.0 | 12.0 | 13.0 |
| Tensile Modulus | [MPa] | 1669 | 1768 | 1735 | 1783 |
| NIS −20° C. | [kJ/m$^2$] | 4.8 | 6.1 | 6.2 | 5.6 |
| MSE 1.5 | [—] | 3.6 | 5.9 | 4.9 | 6.8 |

*Rest to 100 wt.-% are additives, like antioxidants, carbon black and pigments

TABLE 3b

Compositions

|  |  | Example* | | |
|---|---|---|---|---|
|  |  | CE1 | CE 2 | CE 3 |
| HECO 1 | [wt %] | 15 | 15 | 15 |
| HECO 2 | [wt %] | 70 | 70 | 70 |
| Talc | [wt %] | 13 | 13 | 13 |
| MFR | [g/10 min] | 12.3 | 13.5 | 13.1 |
| Tensile Modulus | [MPa] | 1757 | 1756 | 1586 |

TABLE 3b-continued

Compositions

|  |  | Example* | | |
|---|---|---|---|---|
|  |  | CE1 | CE 2 | CE 3 |
| NIS −20° C. | [kJ/m$^2$] | 6.6 | 6.2 | 6.2 |
| MSE 1.5 | [—] | 7.5 | 7.5 | 15.0 |

*Rest to 100 wt.-% are additives, like antioxidants, carbon black and pigments

The invention claimed is:

1. Heterophasic polypropylene composition (HECO1) having a melt flow rate MFR$_2$ (230° C.) measured according to ISO 1133 in the range of 0.5 to 20 g/10 min, said heterophasic polypropylene composition (HECO1) comprises a propylene homopolymer (H-PP) and an elastomeric propylene copolymer (E), wherein:
   (a) said propylene homopolymer (H-PP) has a melt flow rate MFR$_2$ (230° C.) measured according to ISO 1133 in the range of above 10 to 300 g/10 min;
   (b) the xylene cold soluble (XCS) fraction of the heterophasic polypropylene composition (HECO1) has an intrinsic viscosity determined according to DIN ISO 1628/1 (in decalin at 135° C.) in the range of more than 2.5 to below 11.0 dl/g; and
   (c) the comonomer content of the xylene cold soluble (XCS) fraction of the heterophasic polypropylene composition (HECO) is in the range of 10.0 to 25.0 wt. %;
   wherein further;
   (d) the heterophasic polypropylene composition (HECO1) fulfills the inequation (I):

$$0.30 \geq \left(0.241 \times \frac{c}{\text{wt.-\%}}\right) - \left(1.14 \times \frac{IV}{\text{dl/g}}\right) \quad (I)$$

wherein, C is the comonomer content in wt. % of the xylene cold soluble (XCS) fraction of the heterophasic polypropylene composition (HECO1),
IV is the intrinsic viscosity in dl/g of the xylene cold soluble (XCS) fraction of the heterophasic polypropylene composition (HECO1), and
wherein the molecular weight distribution (Mw/Mn) of the xylene cold soluble (XCS) fraction of the heterophasic polypropylene composition (HECO1) is at least 3.5.

2. Heterophasic propylene copolymer (HECO1) according claim 1, wherein the heterophasic propylene copolymer (HECO1) has a comonomer content below 10.0 wt. %.

3. Heterophasic propylene copolymer (HECO1) according to claim 1, wherein the amount of the xylene cold soluble fraction of the heterophasic propylene copolymer (HECO1) is below 35.0 wt. %.

4. Heterophasic propylene copolymer (HECO1) according to claim 1, wherein the comonomer is ethylene.

5. Heterophasic propylene copolymer (HECO1) according to claim 1, wherein the heterophasic polypropylene composition (HECO1) fulfills the inequation (Ia):

$$0.25 \geq \left(0.241 \times \frac{c}{\text{wt.-\%}}\right) - \left(1.14 \times \frac{IV}{\text{dl/g}}\right) \quad (Ia)$$

wherein, C is the comonomer content in wt.-% of the xylene cold soluble (XCS) fraction of the heterophasic polypropylene composition (HECO1), and IV is the intrinsic viscosity in dl/g of the xylene cold soluble (XCS) fraction of the heterophasic polypropylene composition (HECO1).

6. Composition comprising a polyolefin (PO), the heterophasic polypropylene composition (HECO1) according to claim 1, and optionally an inorganic filler (F), wherein the weight ratio between the polyolefin (PO) and the heterophasic polypropylene composition (HECO1) [PO/HECO] is in the range of 2/1 to 8/1 and wherein further the polyolefin (PO) is not a heterophasic polypropylene composition (HECO1) according to claim 1.

7. Composition according to claim 6, wherein the polyolefin (PO) is a polypropylene being different than the heterophasic polypropylene composition (HECO1).

8. Composition according to claim 6, wherein the heterophasic polypropylene composition (HECO1) is present in the composition in an amount in the range of 5 to 30 wt. %.

* * * * *